Feb. 10, 1948. C. F. BURGESS Re. 22,971

CAPILLARY TRANSDUCER

Original Filed Jan. 22, 1945 2 Sheets-Sheet 1

Inventor
Charles F. Burgess
by Robert E. Kahn
Attorney.

Feb. 10, 1948. C. F. BURGESS Re. 22,971
CAPILLARY TRANSDUCER
Original Filed Jan. 22, 1945 2 Sheets-Sheet 2
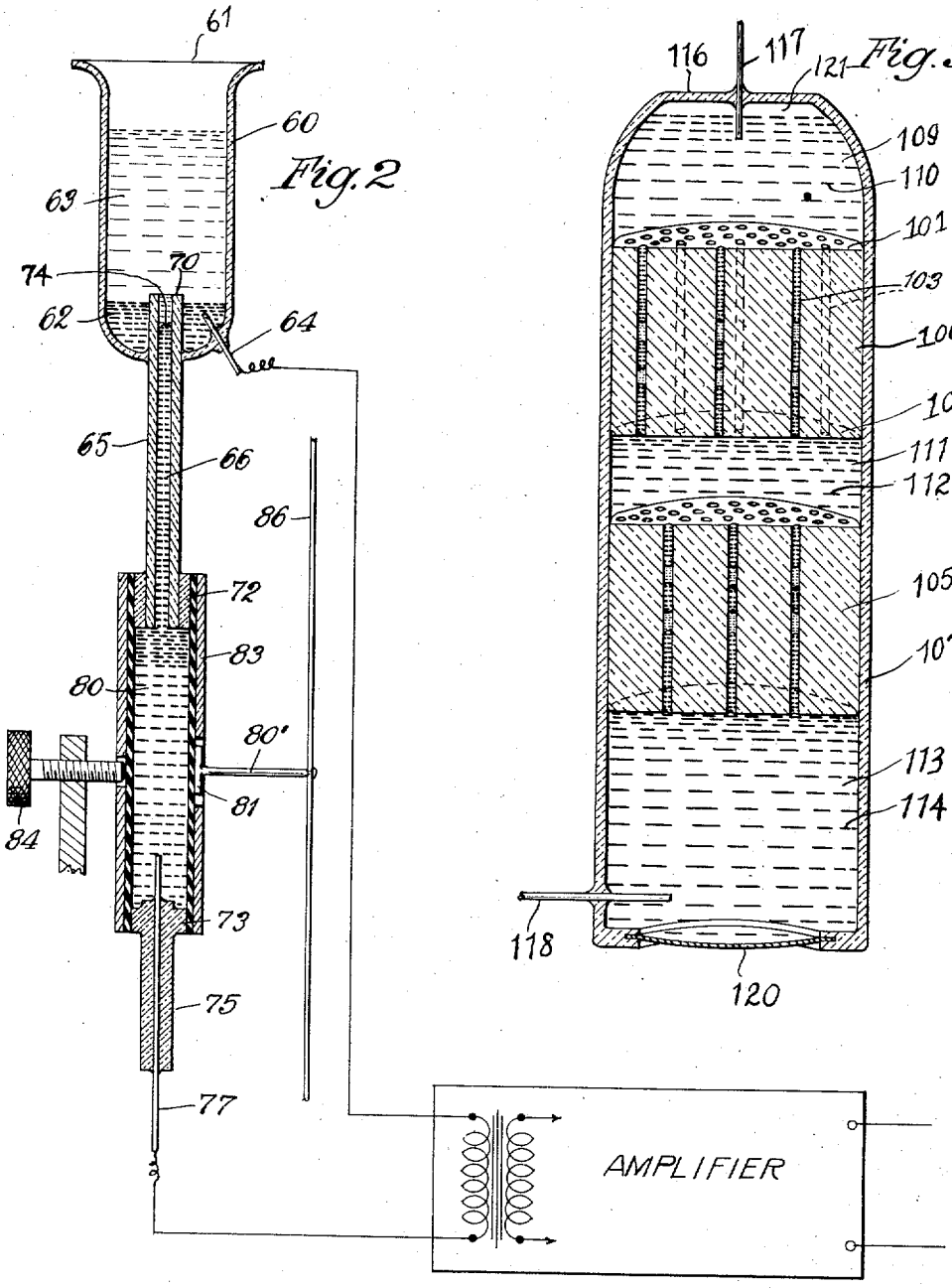
Inventor
Charles F. Burgess
by Robert L. Kahn
Attorney.

Reissued Feb. 10, 1948

Re. 22,971

UNITED STATES PATENT OFFICE 22,971

CAPILLARY TRANSDUCER

Charles F. Burgess, deceased, late of Bokeelia, Fla., by Oliver W. Storey, Wheaton, Ill., trustee Original No. 2,416,978, dated March 4, 1947, Serial No. 573,913, January 22, 1945. Application for reissue August 8, 1947, Serial No. 767,600

9 Claims. (Cl. 171—330)

Figures 1, 4:
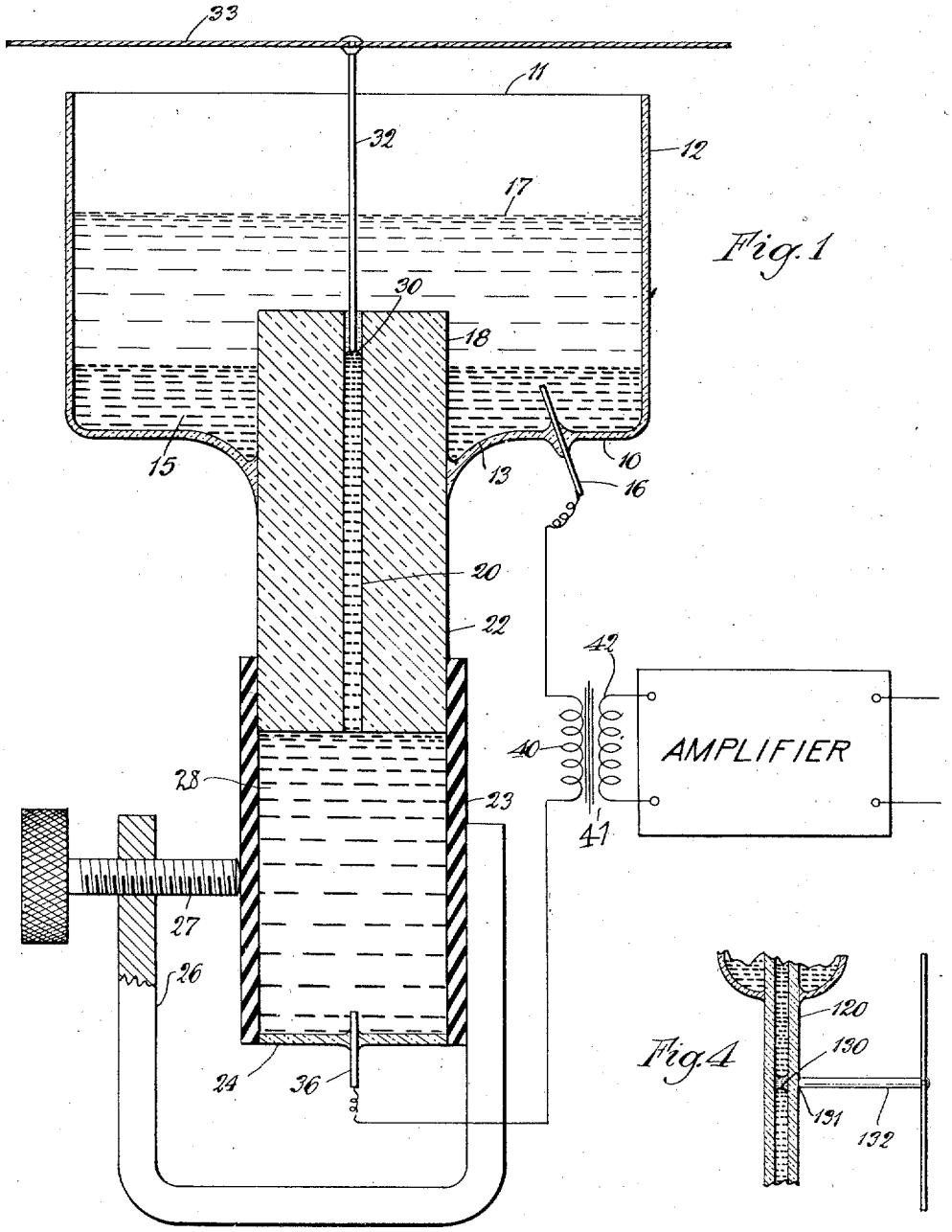

This invention relates to an electrical apparatus and more particularly to a reversible transducer for converting electrical energy into mechanical energy or vice versa. The invention in particular provides an energy-converting means which will convert electrical potential directly into liquid pressures or will convert liquid pressures into electrical potentials.

At present, with one exception, electrical energy can be converted into mechanical energy or vice versa only by the use of solid materials. Thus magnetic or electromagnetic fields may act upon ferromagnetic materials or current-carrying materials. As a rule, this will result in forces being generated in a manner analogous to the action of two magnets. It is also possible to utilize the phenomenon of magnetostriction involving a lengthening of a ferromagnetic material. Apart from the action of a magnetic or electromagnetic field on a liquid carrying current, no direct conversion of energy between electrical or magnetic energy on one hand into mechanical energy on the other hand is possible with a liquid prior to this invention.

Similarly, electrostatic fields may be used in connection with solid materials. Thus, on the one hand, the tendency for two similarly charged particles to separate may be involved in the movement of two conducting plates, such as in the electrostatic type of volt meter. In a piezo electric system, the stress in a crystal due to an electromotive force represents an energy transformation. However, such forces are restricted to crystalline materials. There is no means known in which pressure in a liquid and voltage in a circuit may be directly related to each other as the two parameters in a transducer system.

By virtue of the invention herein, a new and different energy converting cycle is possible and involves on the mechanical side the direct generation of hydraulic pressures. A steady hydraulic pressure represents energy in potential form, while a varying hydraulic pressure is potential energy varying with time, and thus may represent power. It is believed that the invention herein described is the only means known wherein a direct relationship between hydraulic pressure and electric potential is utilized in energy transformation. The transformation may proceed in either direction.

This invention utilizes a capillary electrometer and provides a substantially incompressible mechanical coupling between the capillary meniscus and a point outside of the electrometer system.

This outside point may have either a load or generator for mechanical forces coupled thereto. The electrometer of course has metallic circuit connections to the interface forming liquids. Thus the electrometer system may receive electrical energy from an outside source and supply mechanical energy to the outside point or the operation may be reversed. Hence a true energy transfer from one system to another may be effected. Inasmuch as the energy transformation is effected in the electrometer system as hereinafter described, it follows that this electrometer system is a transducer.

A capillary electrometer involves the action of a liquid conductor and electrolyte meeting in a meniscus interface in proximity to an insulating surface so that capillary forces may exist. In its simplest form, a capillary electrometer comprises a glass tube having a capillary channel therethrough within which mercury and an electrolye, such as dilute sulphuric acid, meet to form an interface. Upon application of an electric potential across said interface, a change of said interface will result. Conversely, upon change of the interface, a potential will be generated. It has hitherto been customary to provide mercury or mercury-bearing substances as means for applying the potential to the liquids on opposite sides of an interface. While the fundamental nature of a capillary electrometer and its operation are still more or less obscure, it is believed that the interface behaves like a condenser in that current conduction does not occur providing the applied potential is maintained below a predetermined threshold value. In the case of mercury and dilute sulphuric acid, the threshold value is approximately one-half volt, and voltages in excess thereof will have deleterious results on the electrometer.

If the electrometer interface is considered as a condenser, calculations have shown that the capacitance thereof per unit area is extremely high in comparison to capacitances of conventional condensers.

The capillary electrometer has hitherto been utilized mainly as a volt meter wherein applied potential across the interface has resulted in interface movement unrestrained by external force. This movement was observed by a microscope or other means. While means for adjusting the zero position of the interface have been shown in the literature, never before has a capillary electrometer had its structure changed so that true transducer action was effected. In order for true transducer action to occur, it is necessary that the energy content of one system be changed, and that the difference in such energy content be communicated to another system.

It has been discovered that true transducer action may be obtained by providing a substantially incompressible mechanical coupling between one or more of the meniscuses and some point outside of the electrometer system. In one form of the invention, an elongated member has one end disposed at a meniscus and extends through the electrometer liquid to a point outside of the electrometer. At this outside point, the member may either receive or give vibratory energy. In another form of the invention, the liquid or liquids making up the electrometer are utilized as part of the incompressible coupling. At any desired region where an electrometer liquid exists, a flexible wall or movable member may be provided. Between this member and the electrometer meniscus is an incompressible coupling in the form of electrometer liquid. The coupling communicates force between said movable or flexible wall and the electrometer meniscus. The movable or flexible mechanical member in contact with the electrometer liquid may provide a pressure communication between the electrometer liquid and some outside system. The outside system may either be the seat of pressure generation or conversely may receive the pressures generated in the electrometer.

By virtue of this construction, it is possible to apply electric potentials across the interface and obtain mechanical responses available for use outside of the electrometer system. Conversely, it is possible to apply mechanical energy and introduce said mechanical energy into the electrometer system and use the potential generated across the interface.

By varying the energy, whether it be electrical or mechanical with respect to time, the converted energy—mechanical or electrical—will vary with time. Thus a conversion between electric power and mechanical power is possible.

While a single capillary electrometer represents a relatively feeble converting device, it is possible to provide a large number of such electrometers and thus, in the aggregate, handle substantial amounts of energy.

In a capillary electrometer, it is believed that the effective portion of the liquid interface, as far as electrometer operation is concerned, is adjacent the insulating solid surface. For this reason, a discrete interface has generally been formed in capillary bores. Such bores have generally been of the order of from ten microns to fifty microns. Finer bores are undesirable due to erratic and secondary effects. Coarser bores in general lack sensitivity.

For a more detailed description of the invention, reference will now be made to the drawing wherein Figure 1 is an elevation of a structure embodying one form of the invention. Figure 2 is an elevation of a modified construction. Figure 3 is a view showing a multi-unit system for handling substantial amounts of power. Figure 4 is a detail of a modified single capillary unit.

Referring first to Figure 1, container 10 of any suitable material such as glass may have open top 11, vertical side 12, and bottom 13. Within container 10, there may be disposed a quantity of mercury 15. Wire 16 of platinum or other suitable metal may be sealed into and pass through bottom 13 of the container to extend into the body of mercury 15. Thus good electrical contact from the outside to mercury 15 is provided. Floating above mercury 15 is electrolyte 17, which may be any one of a number of materials that may be used in an electrometer. About ten or twenty per cent sulphuric acid is commonly used, although organic or inorganic materials for this purpose are well known. Thus aqueous solutions of the hydroxides of sodium or potassium, and aqueous solutions of the alkali metal halides have been used.

Container 10 has glass tube 18 sealed into bottom 13 thereof, and extending up into the liquid above the level of mercury 15. Tube 18 has bore 20. Tube 18 itself may be any size desired and preferably should be heavy enough to withstand mechanical handling. Bore 20 may vary in range as hereinafter described. Tube 18 has bottom portion 22 thereof capped by member 23 of adjustable volume. In its simplest form, member 23 may consist of a piece of heavy rubber tubing closed at bottom 24 and telescoping over bottom end 22 of glass tube 18. The volume of member 23 may be controlled by clamp 26 and screw 27. Member 23 is filled with mercury 28, which mercury extends up into bore 20. The mercury in bore 20 is adjusted so that meniscus 30 is preferably slightly above the level of mercury 15. However, this is not critical and the level of meniscus 30 may be set at any desired point. Electrolyte 17 is disposed within bore 20 so that meniscus 30 forms an interface between mercury and electrolyte. Member 23 is stiff enough so that, once adjusted, its volume remains constant in spite of electrometer operation.

In order to provide for a capillary space in the region of meniscus 30, a rigid member, here shown as needle 32, may be extended down into bore 20 in contact with interface 30.

Needle 32 must extend down into the mercury column sufficiently so that an annular mercury meniscus is formed. The material of which needle 32 is made may either be insulating or conducting. If of insulating material, it may be formed of glass or other similar material. If needle 32 is of conducting material, it may be formed of platinum or other suitable polarizable metal. When needle 32 is of conducting material, proper adjustment of the needle tip may be necessary. The correct adjustment may be obtained by varying the needle position and operating the electrometer. When the needle is correctly adjusted, some polarizing film is formed, since no short circuiting of the interface results. When a conducting needle is correctly adjusted, the conducting nature of the needle is of no significance, and the needle merely provides a mechanical coupling from the meniscus to a point outside of the system.

The diameter of needle 32 is such that the difference in diameter between needle 32 and bore 20 at interface 30 provides an annular capillary region. This capillary region may vary within wide limits. The difference in diameter may be of the order of about one millimeter although this may vary widely. Thus, a capillary region between opposed insulating surfaces of needle 32 and inside wall of bore 20 will be formed.

Needle 32 forms a rigid coupling between interface 30 inside of the capillary electrometer system and a point outside of the entire system. In order to terminate needle 32 in either a load or a generator, it may be fastened to diaphragm 33. It is understood that, instead of diaphragm 33, any other energy absorbing or energy generating means may be used.

To complete the electrical circuit across interface 30, wire 36 may pass through sealed bottom 24 of member 23 and extend into the mercury. Wires 16 and 36 may be connected to primary 40 of transformer 41 whose secondary 42 may be connected in any suitable fashion. If the capillary electrometer system is to convert mechanical energy into electrical energy, a vibration generator is necessary at the free end of needle 32. Mechanical vibrations at needle 32 will change meniscus 30 to generate potentials across the interface. These generated potentials are conducted to primary 40 of transformer 41 and potentials induced in secondary 42 may be amplified or may be utilized directly in some load. Conversely, if reverse action is desired, secondary 42 would be supplied with varying potentials and thus function really as a primary. Winding 40 would have induced therein potentials which would be applied across interface 30 to cause movement thereof. The resulting movement would vibrate needle 32 and thus affect diaphragm 33.

Referring now to Figure 2, a modified structure is shown wherein the liquid in the electrometer is utilized as the incompressible coupling between the capillary interface and a point outside of the electrometer system. Thus container 60 may have open top 61 and, as before, may have bottom layer 62 of mercury and supernatant layer 63 of electrolyte. Lead 64 may be sealed in the bottom of container 60 and contact mercury 62. It is understood that container 60 may be made of glass or any other insulating material. Tube 65 may be sealed to container 60 and extend up inside thereof through the bottom. Tube 65 has capillary bore 66. Capillary bore 66 may vary in size over wide limits between ten microns and one or more millimeters. The length of capillary 66 may vary, although lengths of the order of between one quarter of an inch and three-quarters of an inch may be used successfully.

Tube 65 has upper end 70 above the level of mercury 62 and is open to electrolyte 63. The bottom of tube 65 may have attached thereto rubber tubing 72 whose free end 73 may be sealed in any suitable fashion as by glass stopper 75. Passing through stopper 75 and inside of rubber tube 72 is wire 7. The inside of rubber tube 72 is filled with mercury 80, said mercury extending well up in bore 66. Electrolyte 63 extends down bore 66 to form interface 74 with mercury.

The liquid column between the interface and rubber tube 72 is substantially incompressible and provides a connection between the interface and the wall of said rubber tube. Rubber tube 72 forms the boundary between the outside and the electrometer system itself. In order to provide means for transferring energy from the liquid column to the outside, rod 80' may be cemented to spot 81 on rubber tube 72. The remaining portion of rubber tube 72 is restrained by rigid covering 83 which, in its simplest form, may consist of metal. The volume of rubber tube 72 may be adjusted by clamping screw 84.

Wires 64 and 77 may be connected as in Figure 1. It is clear that, upon application of potential across the interface, movement of meniscus 74 will result in movement of the flexible wall portion and rod 80. The reverse action may also be obtained.

As hereinbefore pointed out, every interface has some threshold voltage below which it is necessary to operate for proper electrometer action. In the case of mercury and dilute sulphuric acid, this value is of the order of about one-half volt per interface. In many instances, it may be desirable to generate or respond to higher voltages. It is therefore understood that discrete globules of mercury and electrolyte may be disposed in capillary 66 to build up as many interfaces as may be desired. It is also possible to parallel two or more electrometers so that currents rather than voltages are added. Because of the similarity in action between an electrometer and a condenser, there will be charging and discharging currents present. In order that substantial amounts of power may be handled, it is possible to provide a composite system wherein a number of electrometers in parallel form a group, and a plurality of such groups may be operated in series.

Thus referring to Figure 3, a power unit is shown having a substantial number of parallel capillary elements to form a group and several (here shown as two) groups in series. Each group may consist of an insulating block 100 having a number of parallel capillary passages therethrough. Thus block 100 may be a short cylinder having top and bottom faces 101 and 102. Capillary passages 103 may extend through from one face to the other. Block 100 may be of glass, polystyrene, Bakelite or any insulating material immune to attack by the electrolyte used, as dilute sulphuric acid. The passages may be drilled, formed when block 100 is softened by heat or any other way. The spacing between adjacent bores should be as small as possible. The diameter of the bores may vary depending upon the process used. Bores of the order of .1 millimeter may be obtained by molding glass or other thermoplastic insulator around a group of spaced wires. The wires may then be removed by dissolving with suitable chemicals.

Two blocks 100 and 105 may be provided with capillary bores. The length of each block may vary. However, the length may advantageously be of the order of one quarter to three quarters of an inch. Each bore preferably has at least two interfaces formed by a globule of electrolyte between mercury columns. Thus a clean block may be dipped into mercury to force some up into each bore. Then the block may have one end dipped into electrolyte, under pressure to force some electrolyte up. Thereafter, a mercury treatment may follow.

Each bore may have as many cascaded interfaces as desired, it being understood that substantially all bores in one group have the same number of interfaces. Because the electrolyte generally has a higher electrical resistance, it is preferred to keep the electrolyte used to a minimum. Hence, there will generally be an even number of interfaces per bore. Thus a single block may have one hundred bores with four interfaces per bore. With two groups in series, this would result in a four-volt threshold voltage. The parallel capacitance will result in a substantial value so that, under certain conditions, heavy currents may flow.

Blocks 100 and 105 may be mounted in line with each other and have a casing 107 surrounding both. Casing 107 may be of the same material as blocks 100 and 105 and firmly joined thereto. Above block 100 is space 109 containing mercury 110. Similarly, space 111, between blocks 100 and 105, may be filled with mercury 112. Below block 105 is space 113 filled with mercury 114. It is understood that the capillary bores through each block form the sole liquid paths between the regions at the ends of each block.

One end of casing 107 may be sealed as at 116. Conductor 117 may be sealed into the casing to make contact with the mercury. Conductor 118 may be sealed at the other end of the casing. Thus, the two terminals will be wires 117 and 118. The bottom of casing 107 may be formed as flexible wall 120. Thus wall 120 may be formed of steel sealed at the edge to the material of casing 107.

Hydraulic pressure may be transmitted through flexible wall 120. The mechanical terminals of the system will be flexible wall 120 and the remainder of casing 107. Casing 107 may be fastened in position so wall 120 may work against a load or be actuated by a load. Air space 121 at the rigid end of the system may provide a restoring force and take up liquid expansion with temperature rise.

The action of the restoring force is not the same as in a simple mechanical spring system. In a capillary electrometer, when an interface has been moved in response to a potential, there is a tendency for the interface to remain in the moved position unless electrical conditions are also permitted to reach a new equilibrium. Conversely, if an interface is moved as a result of mechanical forces and the forces removed, the interface will tend to remain in the same position unless the electrical system can come to a new equilibrium. Gradually, over a period of some hours, the interface will return to a position of complete electrical and mechanical equilibrium due to surface leakage along the insulating container. Hence, any mechanical restoring force provided must be considered not as a complete restoring force for the entire system, but only for the mechanical portion thereof.

While theoretically, it would be desirable for each block to have the same number of capillary bores, in practice, this may be difficult to achieve under certain manufacturing conditions. As long as the number is approximately the same, one group will adapt itself to the remaining groups and the entire unit may operate. It is obvious that the number of capillary bores that may be paralleled in one group has no definite limit. Similarly, any number of groups may be put in series. It is also possible to dispose groups in parallel with each other, so that electrically they are connected together but physically and mechanically they may be separate. Thus heavy charging and discharging currents may impose a practical limit to the number of capillary bores in one group so that, under certain circumstances, it may be desirable to parallel groups.

Inasmuch as each electrometer unit is mechanically and electrically discrete, it follows that a plurality of such units may be connected electrically in series and mechanically in parallel or electrically in parallel and mechanically in series. Thus, the electrical series and parallel connections are obvious and would be the same as connecting other devices such as batteries in series or in parallel. Mechanically, a parallel connection would involve a plurality of units connected to one push rod so that each unit actuated the push rod directly. A series mechanical connection would have one unit operate upon another unit and finally the end unit operate on a load.

Thus, the disposition of the two blocks in Figure 3 constitutes both an electrical and mechanical series connection. It is clear that the series mechanical connection is not necessarily inherent in the series electrical connection. Similarly, the disposition of a plurality of bores through one block constitutes a parallel connection both electrically and mechanically. Again, the parallel electrical and mechanical connections are not necessarily interrelated.

In Figure 4, a detail of a structure is shown wherein the mechanical coupling between the outside and the electrometer system is applied at or near the portion of the system containing the meniscus. Thus capillary 120 may have at least two interfaces 130 formed therein. The remaining portions of the electrometer system may be as shown in Figure 1 or Figure 2. However, it is understood that the mechanical energy coupling point in these figures is not included. At point 131 on the outside of capillary 120, rod 132 may be rigidly connected. Rod 132 may go to some load or generator for handling vibratory energy. By maintaining the rest of the electrometer system rigid, deflections of capillary 120 at point 131 will result in transducer action. It is understood that capillary 120 would have walls thin enough for this purpose. Whether the coupling point between rod 132 and capillary 120 is in line with an interface or not is of no great consequence.

By virtue of the invention herein, a simple transducer for reversible conversion of energy between electrical and mechanical is provided. The mechanical energy is in the form of pressure in a liquid and, as such, may be converted by mechanical means into movement of a mechanical member. By the use of a number of capillaries in parallel, the current handling ability or pressure in a liquid may be increased. By providing a plurality of cascaded interfaces, either in one capillary bore or a plurality of cascaded capillary bores, the potential handling ability or amplitude of a pressure wave may be increased. By combining these two modifications, it is possible to provide a transducer which can handle substantial amounts of energy or power.

The simplicity of such a transducer, together with the direct generation of pressure in a liquid, make it desirable for use in many fields. Thus the transducer may operate in connection with sound transmission between sound waves and corresponding potentials. Other fields of use may be in the detection of minute pressure waves such as exists in seismographs, thickness gauges, and other similar devices. A particularly desirable field for use resides in the generation of potentials corresponding to pressure waves in various portions of living bodies such as, for example, in electric cardiographs and sphygmomanometers.

What is claimed is:

1. A transducer comprising a capillary electrometer, said electrometer including two liquids forming at least one interface therebetween, means for establishing electrical connections to said interface-forming liquids, a substantially incompressible connection from said interface, said incompressible connection going to a point outside of said electrometer system, means at the outside end of said incompressible connection for transmitting vibratory forces between a driven or driving means on the one hand and electrometer interface on the other hand, said means and incompressible connection transmitting vibratory energy from said means to said interface or from said interface to said means depending upon the direction of energy conversion and circuit connections to said electrical connections for coupling a potential generator or load.

2. A transducer comprising a hydraulic system containing at least two different liquids, said system including at least one capillary bore with said liquids meeting in at least one interface to form a capillary electrometer, means for establishing electrical connections to the liquids on opposite sides of said interface, said system including as a part thereof a flexible wall portion, and mechanical means at said wall portion coupled thereto, said electrical conducting means having outside circuit connections so that with said electrometer there is formed a complete circuit, and said coupled means forming with said flexible wall a mechanical system, whereby said electrometer may function as a transducer for converting electrical energy into mechanical energy or vice versa.

3. A transducer comprising a capillary electrometer having two liquids meeting to form an interface, a rigid solid insulating rod extending from said interface to a point outside of said electrometer system, mechanical means coupled to said rod and an electric circuit including said interface.

4. A transducer comprising a capillary electrometer including two liquids meeting to form an interface, a rod extending from said interface to a point outside of said electrometer system, said rod having a portion forming part of a capillary region within which said interface is located, vibration responsive means coupled to said rod and an electric circuit including said interface.

5. A transducer comprising an insulating tube, mercury and an electrolyte in said tube forming an interface, a rod extending within said tube near said interface to a point outside of said tube, said rod and the bore of said tube being so proportioned as to create a capillary annulus at said interface, mechanical means connected to said rod outside of said tube and circuit means including said interface.

6. A transducer comprising a tubular system including a capillary bore, said system having therein two liquids forming an interface in said capillary bore, circuit connections to said interface forming liquids for providing a capillary electrometer, said tubular system including at least a part thereof having a flexible wall and mechanical means on the outside of said tubular system coupled to said wall, said mechanical means being adapted to either receive or generate vibratory energy and said circuit connections being adapted to supply or receive electric potentials.

7. An energy converting device comprising a sealed container having mercury and an electrolyte therein, at least one block of insulating material in said container, said block forming a wall across said container to divide the same into two chambers, said block having a plurality of capillary bores connecting said chambers, said liquids being so disposed in said container and capillaries as to create at least one interface in each capillary, said container having a flexible wall as a part of one chamber for transmitting pressure between one chamber and a region outside of said container, electric circuit connections from the outside of said container passing through the walls thereof to said liquids whereby potentials may be applied across said interface or, if generated, said potential may be conducted to the outside, and mechanical means in said other chamber tending to exert a restoring force to the liquids in said container.

8. The structure of claim 7 wherein said container has at least two blocks spaced from each other to form chambers on each side of each block, the capillary bores in said blocks connecting said chambers in succession.

9. The structure of claim 1 wherein a hermetically-sealed container is provided for the capillary electrometer, said sealed container having a compressible gas in one part thereof.

OLIVER W. STOREY,
*As Trustee for the Partnership of O. W. Storey and Associates, Assignee of Charles F. Burgess, Deceased.*

REFERENCES CITED

The following references are of record in the file of this patent:

FOREIGN PATENTS

| Number | Country | Date |
|---|---|---|
| 15,058 | Denmark | Sept. 11, 1911 |